(12) United States Patent
Van de Beek et al.

(10) Patent No.: US 8,427,935 B2
(45) Date of Patent: Apr. 23, 2013

(54) REDUCTION OF OUT-OF-BAND EMITTED POWER

(75) Inventors: Jaap Van de Beek, Täby (SE); Fredrik Berggren, Upplands Väsby (SE)

(73) Assignee: Huawei Technologies Co. Ltd., Shenzhen (CN)

( * ) Notice: Subject to any disclaimer, the term of this patent is extended or adjusted under 35 U.S.C. 154(b) by 275 days.

(21) Appl. No.: 12/892,642

(22) Filed: Sep. 28, 2010

(65) Prior Publication Data

US 2011/0019528 A1    Jan. 27, 2011

Related U.S. Application Data

(63) Continuation of application No. PCT/CN2008/070628, filed on Mar. 28, 2008.

(51) Int. Cl.
*H04J 11/00* (2006.01)

(52) U.S. Cl.
USPC .......................................................... 370/206

(58) Field of Classification Search ............... 370/203, 370/206, 208, 210; 375/295; 455/522
See application file for complete search history.

(56) References Cited

U.S. PATENT DOCUMENTS

| | | | |
|---|---|---|---|
| 7,376,202 B2 * | 5/2008 | Bar-Ness et al. | 375/296 |
| 7,450,532 B2 * | 11/2008 | Chae et al. | 370/310 |
| 7,817,733 B2 * | 10/2010 | Carsello | 375/260 |
| 2004/0162097 A1 | 8/2004 | Vijayan et al. | |
| 2006/0077885 A1 | 4/2006 | Schnell et al. | |
| 2006/0133261 A1 | 6/2006 | Cosovic et al. | |
| 2007/0195898 A1 | 8/2007 | Yamaguchi | |
| 2008/0107054 A1 * | 5/2008 | Parts et al. | 370/310 |
| 2008/0248746 A1 * | 10/2008 | De Ruijter | 455/39 |
| 2010/0020895 A1 * | 1/2010 | Jiang et al. | 375/295 |

FOREIGN PATENT DOCUMENTS

| | | |
|---|---|---|
| CN | 1823278 A | 8/2006 |
| CN | 101098326 A | 1/2008 |
| WO | WO 2009/117874 A1 | 10/2009 |

OTHER PUBLICATIONS

Written Opinion of the International Searching Authority issued in corresponding PCT Patent Application No. PCT/CN2008/070628, mailed Jan. 8, 2009.

Extended European Search Report issued in corresponding European Patent Application No. 08734042.8, mailed Sep. 26, 2011.

Brandes et al., "Reduction of Out-of-Band Radiation in OFDM Systems by Insertion of Cancellation Carriers" IEEE Communications Letters. vol. 10, No. 6 Jun. 2006.

Yamaguchi, "Active Interference Cancellation Technique for MB-OFDM Cognitive Radio" 34th European Microwave Conference. Amsterdam, 2004.

Batra et al., "Multi-Band OFDM: A Cognitive Radio for UWB" ISCAS IEEE 2006.

(Continued)

*Primary Examiner* — Chi Pham
*Assistant Examiner* — Robert Lopata
(74) *Attorney, Agent, or Firm* — Brinks Hofer Gilson & Lione

(57) ABSTRACT

OFDM signal transmission of reduced power emission outside a designated transmission bandwidth is disclosed. At least one subcarrier is allocated for an OFDM symbol for non-data. A weighting signal representation is determined based on an initial error signal representation, which is determined from at least part of a first OFDM symbol and part of a second OFDM symbol, the first and second OFDM symbols being consecutive in time.

18 Claims, 4 Drawing Sheets

OTHER PUBLICATIONS

Jayalath et al., "Reducing the Out of Band Radiation of OFDM Using an Extended Guard Interval" IEEE 2001.

Pauli et al., "On the Reduction of the Out-of-Band Radiation of OFDM-Signals" IEEE 1998.

Chan et al., "Solving Quadratically Constrained Least Squares Using Black Box Solvers" BIT 32, 1992.

Chung, "Spectrally Precoded OFDM" IEEE Transactions on Communications, vol. 54, No. 12, Dec. 2006.

Cosovic et al., "Subcarrier Weighting: A Method for Sidelobe Suppression in OFDM Systems" IEEE Communications Letters vol. 10, No. 6, Jun. 2006.

Mahmoud et al., "Sidelobe Suppression in OFDM-Based Spectrum Sharing Systems Using Adaptive Symbol Transition" IEEE Communications Letters vol. 13, No. 2, Feb. 2008.

$3^{rd}$ Generation Partnership Project, "Technical Specification Group Radio Access Network; Evolved Universal Terrestrial Radio Access (E-UTRA); Base Station (BS) Radio Transmission and Reception" Release 8. 3GPP TS 36.104, V8.0.0, Dec. 2007.

$3^{rd}$ Generation Partnership Project, "Technical Specification Group Radio Access Network; Feasibility Study for Orthogonal Frequency Division Multiplexing (OFDM) for UTRAN Enhancement" Release 6. 3GPP TR 25.892, V6.0.0, Jun. 2004.

\* cited by examiner

REDUCTION OF OUT-OF-BAND EMITTED POWER

This application is a continuation of PCT international application No. PCT/CN2008/070628, filed on Mar. 28, 2008, incorporated herein in its entirety by reference.

TECHNICAL FIELD

The present invention relates to a field of technology of reduction of an OFDM (Orthogonal Frequency Division Multiplex) signal's power, as emitted by a transmitter, outside a designated transmission bandwidth, where the OFDM signal is composed of consecutive OFDM symbols and is transmitted by the use of a set of subcarriers. The present invention also relates to a field of technology of computer programs and computer program products therefore.

BACKGROUND

Orthogonal Frequency Division Multiplexing (OFDM) has been selected for the air-interface in many communication systems, e.g. in 3rd Generation Partnership Project Evolved UMTS Terrestrial Radio Access (3GPP E-UTRA). These communication systems can facilitate high spectral efficiency on each radio link, since OFDM is suitable for combination with Multiple Input Multiple Output processing (MIMO-processing) and opportunistic transmission schemes.

However, the spectral efficiency of the system also depends on the power level of the out-of-band emission, i.e. the power level of the OFDM signal being emitted outside a designated transmission bandwidth. The out-of-band emissions must be kept below certain levels in order not to cause significant interference in adjacent frequency bands. If the out-of-band power is efficiently suppressed, adjacent frequency channels can be spaced densely and thereby the system's spectral efficiency is improved.

For these reasons, in many system standards, the out-of-band power emissions are regulated and restricted. Several types of requirements exist to regulate the out-of-band power emissions of a signal. In E-UTRA for example, spectral masks, adjacent-channel-leakage-ratios and occupied bandwidth requirements have been defined.

An OFDM signal (being a multiplex of a large number of finite-length complex exponentials) has a power spectrum determined by a number of squared-sinc-shaped functions. Typically, due to the finite length of the exponentials, OFDM signals will not meet a standard's requirements on out-of-band emission, since the spectrum sidelobes decay slowly. This slow decay causes the OFDM power spectrum to become relatively broad, resulting in problematic out-of-band emissions, which have to be reduced in some way.

The power spectrum of an OFDM signal is determined by two quantities; a pulse shape and a correlation between the transmitted symbols. In the prior art, two categories of methods for reducing out-of-band emission have been developed, each of these two categories dealing with one of these quantities of the OFDM signal.

When all data symbols in the OFDM signal are uncorrelated, the slow decay of the OFDM spectrum is caused by the finite-duration property of the pulse shape for the individual OFDM symbols constituting the OFDM signal. The finite-duration causes here instantaneous changes in the phase and amplitude of the signal at the edges of the OFDM symbols. In other words, out-of-band power emanates from the signal transitions between different OFDM symbols.

In prior art, time-windowing of the OFDM signal has been proposed in order to tie consecutive OFDM symbols together. This method belongs to the first category mentioned above, i.e. it changes the pulse shape, and uses a prolonged cyclic prefix and an additional postfix. By overlapping a time-windowed postfix of a previous symbol with a time-windowed cyclic prefix of a current symbol, a continuous transition among the two symbols is here achieved. However, due to the use of a longer cyclic prefix used by the method, the symbol rate and/or spectral efficiency of the system decreases when the method is implemented.

Also, time-windowing could be performed without overlapping the two consecutive OFDM symbols. This variant can be regarded as a ramping in the front and end of the OFDM symbol, forcing its beginning and end to the same point, namely zero. However, the ramping method results in a shorter effective cyclic prefix, and thus also in a higher sensitivity to channel dispersion.

Further, in some prior art solutions belonging to the second category mentioned above, i.e. introducing correlation between transmitted data symbols, data subcarriers are pre-processed prior to the IFFT. According to one method, data symbols are weighted with real-valued numbers. These weights are chosen to reduce the out-of-band emissions caused by the rectangular pulse shape. Due to this weighting, the Bit Error Rate (BER) will increase the more the out-of-band emission is suppressed.

Further, in other prior art solutions belonging to the second category mentioned above, i.e. introducing correlation between transmitted data symbols, cognitive multi-band OFDM systems have been considered where the problem is to achieve low interference in certain parts of the frequency band.

Methods have been proposed, whose purpose is to create frequency notches within the OFDM frequency band, in which other systems could operate. Solutions according to these methods achieve a form of in-band power emission reduction, where the interference in a so called victim-band should be minimized. The unwanted power in the victim-band is due to the finite duration of the OFDM symbols, which translates to an unlimited width of the frequency spectrum, such that the frequency spectrum for OFDM only is zero at the subcarrier frequencies. Hence, there will be undesired in-band power at frequencies located between subcarriers.

SUMMARY

Abovementioned prior art methods do not try to correct the fundamental cause of the unwanted emissions, i.e. the finite duration of the OFDM symbol. Instead, they try to reduce the negative effects resulting from these emissions.

Prior art as above presents inefficient solutions having drawbacks regarding symbol rate, spectral efficiency and interference. Also, the prior art solutions try to reduce the effects/symptoms of the unwanted out-of-band emissions, and do not try to correct the cause of the unwanted emissions.

Embodiments of present invention aim to provide a more efficient reduction of an OFDM signal's emitted power outside a designated transmission bandwidth than the methods known in the art. More specifically, embodiments of present invention aim to contend the origin for the unwanted emission.

An aspect of the invention is an embodied method where the transmitter performs the following processing:

allocating at least one non-data subcarrier, determining a weighting vector based on an initial error vector, the initial error vector being determined from a time domain signal of at least part of the at least a first one of the plurality of OFDM symbols and at least a part of a second one of the plurality of OFDM symbols, the second one of the plurality of OFDM symbols being previous to the first one of the plurality of OFDM symbols, modulating the at least one non-data subcarrier using the weighting vector, and transmitting modulated at least one data subcarrier and the at least one non-data subcarrier.

An aspect of the invention is also a computer program and a computer program product executing processing control according to the method above.

Further, an aspect of the invention is also a transmitter comprising:

an allocation device, being arranged to allocate at least one non-data subcarrier, a determination device, being arranged for determining a weighting vector based on an initial error vector, the initial error vector being determined from a time domain signal of at least a part of a current OFDM symbol and at least a part of a previous OFDM symbol, a modulation device, being arranged for modulating the at least one non-data subcarrier using the weighting vector, and an addition device, being arranged to add the at least one non-data subcarrier to the set of subcarriers of transmission.

Embodiments of the invention thus modulate non-data subcarriers in the OFDM-system with properly chosen values for the purpose of minimizing the phase/amplitude change, in the time domain, between the previous OFDM symbol and the current OFDM symbol. In other words, by proper modulation the invention adapts, in the time domain, the initial part of the current OFDM symbol to the last part of the previous symbol and can thus be seen as a "smoothing" of the phase/amplitude transition between the symbols.

Thereby, a signal discontinuity of the symbol transitions between consecutive OFDM symbols is contended directly in the time domain with the effect that out-of-band emissions are reduced. By focusing on the discontinuities for the transitions in the time domain, the cause of the out-of-band emission problem is dealt with. Preferably, signal transitions are smoothed such that desired order of continuity is achieved if possible. Smooth and/or (higher-order) continuity at symbol transitions in the time domain results in a spectrum with a fast decay in the frequency domain, and thus results in low out-of-band emission.

Detailed example embodiments and advantages of the out-of-band emission reduction will be described with reference to the appended drawings illustrating some preferred embodiments.

DETAILED DESCRIPTION

Figure 1:
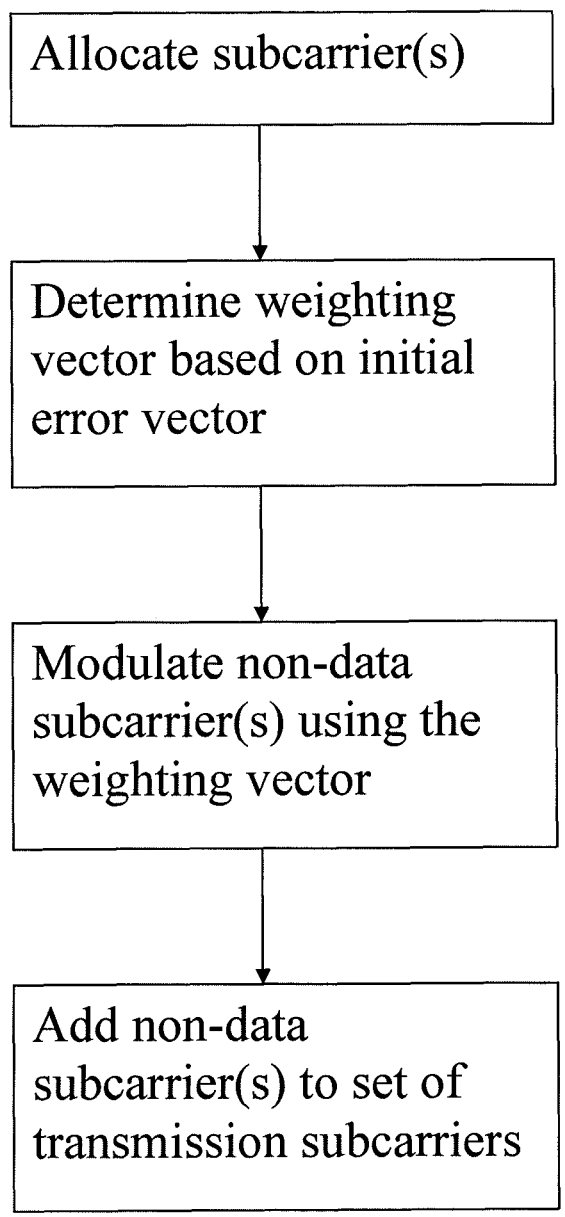
FIG. 1 shows a flow chart for example operations of a transmitter device in accordance with the invention.

A method known as Active Interference Cancellation (AIC) computes an interference contribution of surrounding data symbols to a victim-band. Instead of creating a guard band by nulling subcarriers next to the victim band, these subcarriers, and possibly also subcarriers within the victim-band, are modulated so as to minimize the power in the victim-band. This method leads to a least-squares problem defined in the frequency domain on a symbol by symbol basis for OFDM symbols, the solution of which is modulation symbols that should be used on the AIC subcarriers in order to cancel as much as possible of the interference power within the victim-band.

Variants of the AIC concept, known to introduce correlation between data symbols within one OFDM symbol of transmission, put the victim band as a side-band (and not an in-band as in AIC) but suffer from a same or similar shortcoming as for AIC, identified to be due to the fact that operations on a symbol-by-symbol basis do not exploit earlier transmitted OFDM symbols known at the transmitter when transmitting subsequent OFDM symbol resulting in unsatisfactory performance in terms of out-of-band emissions.

It is noted that both the AIC method and the abovementioned variant provide actions or measures trying to mitigate the effects of unwanted emission in the frequency spectrum, modulating subcarriers as determined based on the shape of the OFDM spectrum in the frequency domain.

An OFDM signal g(t) forms, in the time-domain, a sequence in time of OFDM symbols $s_i(t)$:

$$g(t) = \sum_{i=-\infty}^{\infty} s_i(t - iT), \quad \text{(eq. 1)}$$

where $T = T_s + T_g$ for $T_s$ being the useful symbol time and $T_g$ being a guard interval for the OFDM symbol. According to the present invention, the i:th transmitted OFDM symbol in this sequence, inclusive of a preferred cyclic prefix, is modeled as $$s_i(t) = \begin{cases} \sum_{k \in I_D} d_{k,i} e^{j2\pi f_k t} + \sum_{k \in I_C} c_{k,i} e^{j2\pi f_k t} & -T_g \leq t < T_s \\ 0 & \text{elsewhere,} \end{cases} \quad \text{(eq. 2)}$$

where $d_{k,i}$ are the data symbols, $c_{k,i}$ are well-chosen complex-valued weights, and $I_D$ and $I_C$ are disjoint sets containing subcarrier indices. The classical OFDM choice $f_k = k/T_s$ guarantees that orthogonal reception of the symbol is possible.

The set $I_D$ contains indices to data subcarriers, which are used for data modulation, and the set $I_C$ contains indices to one or more non-data subcarriers, which are used for transmission of modulation weights $c_{k,i}$. Thus, a certain number of one or more non-data subcarriers are reserved for carrying these weights $c_{k,i}$.

Provided a given number of data subcarriers, the one or more non-data subcarriers are added to the existing data subcarriers. Provided a given total number of subcarriers, some data subcarrier(s) need be sacrificed to allow for one or more non-data subcarriers.

The one or more non-data subcarriers are known to/recorded at the transmitter and they are orthogonal to the data subcarriers carrying data. Therefore, if the modulation to be used for these one or more non-data subcarriers is performed by appropriately choosing modulation weights for the modulation, the one or more non-data subcarriers can be disregarded by a receiver while reducing the out-of-band emission from the transmitter.

According to some embodiments of the invention the number of the one or more non-data subcarriers is fixed and predetermined. According to a particular embodiment of the invention, the allocation of these one or more non-data subcarriers is predetermined and fixed, such that the same non-data subcarriers are used for every OFDM symbol.

According to a further embodiment of the present invention, the allocation of the non-data subcarriers is allowed to vary from OFDM symbol to OFDM symbol in the OFDM signal. Thus, the number of non-data subcarriers used may alternate over time. Having varying subcarriers allocated for different symbols has advantages relating to the spectrum of the transmitted signal, as will be explained below.

According to an embodiment of the present invention, the number of the one or more non-data subcarriers to be used is determined based on an energy constraint. This helps to control the energy used for the weighting vector $c_i$.

Further, the allocation of non-data subcarriers and also of data subcarriers is, according to an embodiment, known by a receiver receiving the OFDM signal. The allocation of subcarriers is, according to another embodiment, signaled to the receiver from the transmitter. Then, information relating to which data subcarriers and non-data subcarriers being used for the transmission is received by the receiver and is utilized for the reception.

When considering two consecutive OFDM symbols, to avoid high-frequency content in the power spectrum of the OFDM signal g(t), the signal transition from the (i−1):th OFDM symbol to the i:th symbol in the time domain is preferably made smooth.

Minimizing or eliminating amplitude and phase difference (of various orders) in a symbol transition in the time domain essentially means that a measure of a difference of the (i−1):th OFDM symbol and the i:th symbol at the time-boundary between these symbols, $|s_{i-1}(T_s) - s_i(-T_g)|$, should be made small or zero.

According to a first embodiment of the invention, the out-of-band emission of the signal g(t) is reduced by letting the weighting vector $c_{k,i}$ in equation (eq. 2) used for modulating the one or more non-data subcarriers, be determined from the set of equations:

$$\left.\frac{d^n}{dt^n} s_i(t)\right|_{t=-T_g} = \left.\frac{d^n}{dt^n} s_{i-1}(t)\right|_{t=T_s}, \quad n \in I_N \quad (eq.\ 3)$$

where the set $I_N$ contains non-negative integers. These equalities mathematically formulate the requirement of continuity of the OFDM signal (n=0) and its derivatives (n≧1) at the OFDM symbol-boundaries in equation (eq. 1). For computing the derivatives in the point $t=T_s$, it can be assumed that $s_i(t)$ can be continued into the next OFDM symbol's interval. Hereafter, in this document, this assumption is made for the calculations of derivatives in the point $t=T_s$.

Together with equation (eq. 2), the requirements in equation (eq. 3) can directly be written as a set of linear equations for the weighting vector $c_{k,i}$ to be used for modulation of the non-data subcarriers:

$$\sum_{k \in I_C} c_{k,i} A(n, f_k) + \sum_{k \in I_D} d_{k,i} A(n, f_k) = \quad (eq.\ 4)$$

-continued
$$\sum_{k \in I_C} c_{k,i-1} B(n, f_k) + \sum_{k \in I_D} d_{k,i-1} B(n, f_k),$$

for $n \in I_N$,
where the kernels $$A(n, f_k) = f_k^n e^{-j2\pi f_k T_g}$$

$$B(n, f_k) = f_k^n \quad (eq.\ 5)$$

describe the contribution of a modulated OFDM subcarrier $f_k$ to the n:th derivative of an OFDM symbol at time $t=-T_g$ and $t=T_s$, respectively.

The set of linear equations in equation (eq. 4) can conveniently be written in matrix form as $$A_C c_i + A_D d_i = B_C c_{i-1} + B_D d_{i-1}, \quad (eq.\ 6)$$

where the entries of the matrices $A_D$ and $B_D$, being of size $|I_N| \times |I_D|$, are the values $A(n, f_k)$ and $B(n, f_k)$ associated with $n \in I_N$ and $k \in I_D$, respectively, while the entries of the matrices $A_C$ and $B_C$, having the size $|I_N| \times |I_C|$, are the values $A(n, f_k)$ and $B(n, f_k)$ associated with $n \in I_N$ and $k \in I_C$, respectively. Equation (eq. 6) can finally be written as:

$$A_C c_i + b_i = 0, \quad (eq.\ 7)$$

Where an initial error vector $b_i$ is defined as:

$$b_i = A_D d_i - (B_C c_{i-1} + B_D d_{i-1}). \quad (eq.\ 8)$$

Note here that both the weighting vector $c_{i-1}$ and the data symbols $d_{i-1}$ in the second part $(B_C c_{i-1} + B_D d_{i-1})$ of the initial error vector $b_i$ already are known at the transmitter, since $c_{i-1}$ was calculated for the previous OFDM symbol. Therefore, in a practical implementation, the second part of the initial error vector $b_i$ does not have to be computed again for the following symbol, but can be stored after transmission of each OFDM symbol. Thus, the second part is stored as a whole, instead of separately storing each matrix and vector included in the second part $(B_C c_{i-1} + B_D d_{i-1})$. This results in an efficient data memory utilization.

Note here also that the first part $(A_D d_i)$ of the initial error vector $b_i$ relates to the i:th symbol and the data subcarriers, whereas the second part $(B_C c_{i-1} + B_D d_{i-1})$ of the initial error vector $b_i$ relates to the (i−1):th symbol and both data subcarriers and non-data subcarriers.

According to another embodiment of the present invention, the matrices $A_C$, $A_D$, $B_C$, $B_D$ are determined in an alternative way. Here, the out-of-band emission of the OFDM signal g(t) is reduced by letting elements of the weighting vector, $c_{k,i}$, in equation (eq. 2) be determined from the set of equations:

$$s_i(t_n - T_g) = s_{i-1}(t_n), \quad t_n \in I_N, \quad (eq.\ 9)$$

where $I_N$ is preferably a set containing sampling time-points.

According to an embodiment of the invention, the samples are taken at points in time corresponding to uniform sampling based on a sampling time-period, $T_{samp}$, whereby $t_n = n \cdot T_{samp}$, where n is an integer. For the case of a non-zero guard-interval, the sampling period is typically selected to be the same for the (useful) symbol time and the guard interval, $T_{samp} = T_s/M = T_g/L$, where M and L are positive integers corresponding to number of samples during the (useful) symbol time and the guard interval, respectively. The sampling period may be chosen quite freely and is related to the algorithm solving equation (eq. 9), but not necessarily to the actual sampling rate that may be used for generating the transmit signal. Hence, $T_{samp}$ can be said to denote a virtual sampling period. The index set $I_N$ contains non-negative indices, describing which samples are to be continuous. For the case of uniform sampling with M samples corresponding to the (useful) symbol time, $|I_N|<M$, for a positive integer M.

These equalities mathematically formulate the continuity and periodic extension of the sampled OFDM signal at the OFDM symbol-boundaries. Thus, a periodic extension of the part of the OFDM symbol containing useful data is performed, such that the (i−1):th symbol is extended as if it would have continued into the time interval of the i:th symbol.

Together with equation (eq. 2), the requirements in equation (eq. 9) can directly be written as a set of linear equations in the weights $c_{k,i}$ to be used for modulation of the non-data subcarriers:

$$\sum_{k \in I_D} d_{k,i} e^{j2\pi f_k(t_n-T_g)} + \sum_{k \in I_C} c_{k,i} e^{j2\pi f_k(t_n-T_g)} == \sum_{k \in I_D} d_{k,i-1} e^{j2\pi f_k t_n} + \sum_{k \in I_C} c_{k,i-1} e^{j2\pi f_k t_n} \quad \text{(eq. 10)}$$

for $t_n \in I_N$.

This can be written as:

$$\sum_{k \in I_C} c_{k,i} A(n,k) + \sum_{k \in I_D} d_{k,i} A(n,k) = \sum_{k \in I_C} c_{k,i-1} B(n,k) + \sum_{k \in I_D} d_{k,i-1} B(n,k), \quad \text{(eq. 11)}$$

for $t_n \in I_N$.

Where the kernels $$A(n,k) = e^{j2\pi f_k(t_n-T_g)}$$

$$B(n,k) = e^{j2\pi f_k t_n}, \quad \text{(eq. 12)}$$

describe the contribution of a modulated OFDM subcarrier $f_k$ to the sample at $t=t_n-T_g$ and the sample at $t=t_n$ of an OFDM symbol, respectively. This set of linear equations can conveniently be written in matrix form as $$A_C c_i + A_D d_i = B_C c_{i-1} + B_D d_{i-1}, \quad \text{(eq. 13)}$$

where the entries of the matrix $A_D$ and $B_D$, having the size $|I_N| \times |I_D|$, are the values $A(n,k)$ and $B(n,f_k)$ associated with $n \in \{n: t_n \in I_N\}$ (or for $I_N$ a set of sample indices, $n \in I_N$) and $k \in I_D$, respectively, while the entries of the matrices $A_C$ and $B_C$, of size $|I_N| \times |I_C|$, are the values $A(n,f_k)$ and $B(n,f_k)$ associated with $n \in \{n: t_n \in I_N\}$ (or for $I_N$ a set of sample indices, $n \in I_N$) and $k \in I_C$, respectively.

The requirement in equation (eq. 13) can finally be written as:

$$A_C c_i + b_i = 0, \quad \text{(eq. 14)}$$

where an initial error vector $b_i$ is defined as:

$$b_i = A_D d_i - (B_C c_{i-1} + B_D d_{i-1}). \quad \text{(eq. 15)}$$

In correspondence with what was stated above in connection with equation (eq. 8), both the weighting vector $c_{i-1}$ and the data symbols $d_{i-1}$ of the initial error vector $b_i$, are already known by the transmitter. Therefore, $(B_C c_{i-1} + B_D d_{i-1})$ can be stored as a whole after transmission of each OFDM symbol, which results in an efficient memory use. In particular, this vector contains samples of the (i−1):th OFDM symbol $s_{i-1}(t_n)$ for $t_n \in I_N$.

Thus, from the sets of equations being determined from equation (eq. 3), matrices $A_C$, $A_D$, $B_C$, $B_D$, describing the contribution of the modulated carriers to the signal shape of the current OFDM symbol, as well as an initial error vector $b_i$ are derived from at least one pair of derivatives originating from the current OFDM symbol and the previous OFDM symbol, respectively.

Correspondingly, from the sets of equations being determined from equation (eq. 9), corresponding matrices $A_C$, $A_D$, $B_C$, $B_D$, and a corresponding initial error vector $b_i$ are derived from at least one pair of samples originating from the current OFDM symbol and the previous OFDM symbol, respectively.

A person skilled in the art also realizes that there are other ways of determining corresponding matrices $A_C$, $A_D$, $B_C$, $B_D$ and corresponding initial error vectors $b_i$.

Further, both the embodiment of the invention corresponding to equation (eq. 3) and the embodiment corresponding to equation (eq. 9), result in an expression, $A_C c_i + b_i = 0$, which includes the matrix $A_C$, the initial error vector $b_i$ and the weighting vector $c_i$. The weighting vector $c_i$ is here a vector of size $|I_C| \times 1$, containing the weights $c_{k,i}$. As stated before, the entries of the $|I_N| \times |I_C|$-matrix $A_C$ and the $|I_N| \times 1$-vector $b_i$ follow from equation (eq. 3) or (eq. 9).

The weighting vector $c_i$ to be used for modulating the non-data subcarriers in order to reduce out-of-band emission is determined by evaluating a remaining error including the weighting vector $c_i$ and the initial error vector $b_i$. The evaluation is performed by trying to find a solution for the weighting vector $c_i$, which minimizes a measure for the remaining error vector. The remaining error vector is defined as $A_C c_i + b_i$, and the measure is defined as the norm $\|A_C c_i + b_i\|$. Thus, the evaluation is performed in accordance with:

$$\min_{c_i} \|A_C c_i + b_i\| \quad \text{(eq. 16)}$$

If a certain weighting vector $c_i$ exists, which results in a remaining error vector having a measure being zero, i.e. $\|A_C c_i + b_i\| = 0$, the desired continuity in the time domain can be achieved. According to an embodiment of the present invention, this certain weighting vector $c_i$ is then used for modulating the non-data subcarriers being allocated, which achieves continuity for a transition between a previous and a current symbol.

However, in general there may be more columns (corresponding to subcarriers) than rows (corresponding to signal points or derivatives) in the matrix $A_C$, leading to an underdetermined system, which has an infinite number of solutions. In this case, there is a problem how to select a proper solution.

The converse may also hold, where the equation system becomes overdetermined, which has no solutions. Therefore, if there is no perfect solution present for equation (eq. 16), i.e. $\|A_C c_i + b_i\| \neq 0$, according to an embodiment of the present invention, a certain weighting vector $c_i$, which minimizes a measure, such as the norm $\|A_C c_i + b_i\|$ of the remaining error vector $A_C c_i + b_i$, is preferably chosen for modulating the allocated non-data subcarriers.

According to an embodiment of the present invention, for the case that $\|A_C c_i + b_i\| \neq 0$, an optimization criterion is used, from which the weighting vector $c_i$ can be found. In this embodiment, the optimization criterion is subject to an energy constraint. Here, the remaining error norm should be minimized in a Euclidean sense (Euclidean norm). In practice, the total signal energy E of the non-data subcarriers need be constrained.

Thus, according to this embodiment of the present invention, a certain weighting vector $c_i$, which, under the energy constraint, minimizes the measure, such as the norm $\|A_C c_i + b_i\|$ of the remaining error vector $A_C c_i + b_i$, is chosen for modulating the allocated non-data subcarriers. Thus, the certain weighting vector $c_i$ is determined such that:

$$\min_{c_i} \|A_C c_i + b_i\|, \|c_i\| \leq \sqrt{E}, \qquad \text{(eq. 17)}$$

where $\|c_i\| \leq \sqrt{E}$ provides the energy constraint

This type of problem formulation is known as such in prior art literature as a constrained least squares problem. A person skilled in the art can generalize the problem by using other norms than the Euclidean norm.

Further, the constraint in equation (eq. 17) limits the energy that is used to modulate the subcarriers through the energy parameter E. If the average energy of a subcarrier used for the weighting vector $c_i$ is larger than the energy used for transmitting a data symbol, the spectrum will have a comb-like shape, with peaks at the subcarriers in $I_C$. Such peaks could be an undesirable property if the signal must fit into a spectral mask.

As was mentioned above, according to an embodiment of the invention these peaks are averaged out by varying the number of subcarriers in the set $I_C$ between different OFDM symbols. In that case, the set $I_C$ should vary according to a pattern known by or being signaled to the receiver.

Further, according to an embodiment of the present invention, the size of the initial error vector $b_i$ and the remaining error vector $A_C c_i + b_i$, i.e. the number of elements in these error vectors, varies from OFDM symbol to OFDM symbol of said OFDM signal.

According to an embodiment of the invention, the variation of the number of elements in the initial error vector $b_i$ and the remaining error vector $A_C c_i + b_i$ depends on an energy constraint. This helps to control the energy used for the weighting vector $c_i$.

Further, since the distance between symbol samples $s_i(-T_g)$ and $s_{i-1}(T_s)$ may be large compared to the energy constraint E, the solution may result in a large measure of the remaining error vector $\|A_C c_i + b_i\|$. One way of reducing the measure of the remaining error vector is to increase the energy E. However, this may not be allowed for reasons related to design, complexity or cost the transmitter.

According to one embodiment of the present invention, the measure of the remaining error vector is minimized by aligning the phase of the two symbols before determining the initial error vector $b_i$. That is, the phase of the current symbol at the boundary $s_i(-T_g)$ is rotated back to coincide with the phase at the boundary for the previous symbol $s_{i-1}(T_s)$. Hence, the signal samples $s_i(-T_g)$ and $s_{i-1}(T_s)$ become closer located in the complex plane and less energy will be required to tie the two symbols together. Preferably, in a practical implementation, the phase rotation is achieved by multiplying the i:th OFDM symbol $s_i(t)$ with a phasor, $e^{j\phi}$ where $\phi$ corresponds to the phase difference between $s_i(-T_g)$ and $s_{i-1}(T_s)$.

As is clear to a skilled person, the phase rotation can also be performed at different stages of the method, and can be implemented in any practical way achieving a phase alignment of the two symbols.

Also, the phase rotation does not alter the power of the signal, but it affects the channel estimation. For channel estimation using pilot tones from one OFDM symbol, the phase shift of the phase rotation may be transparent to the receiver, which then treats it as part of the channel. For OFDM symbols not containing any pilot tones, the receiver needs to estimate the phase rotation angle, or should be signaled information related to this angle.

FIG. 1 shows a flow diagram for a transmitter working in accordance with the method of the present invention.

In the first step, at least one non-data subcarrier is allocated. In the second step, a weighting vector is determined based on an initial error vector, where the initial error vector is determined from a time domain signal shape of at least a part of a current OFDM symbol and at least a part of a previous OFDM symbol, respectively. In the third step, the at least one non-data subcarrier is modulated by the use of the weighting vector. In the fourth step, the at least one non-data subcarrier is added to the set of subcarriers used for the transmission of the signal.

Further, the different steps of the method of the present invention described above, and the embodiments of the invention, can be combined or performed in any suitable order. A condition for this of course, is that the requirements of a step, to be used in conjunction with another step of the method of the invention, in terms of available measures, such as initial and remaining error vectors, allocation of non-data subcarriers, phase rotations etc., must be fulfilled.

Figure 2:
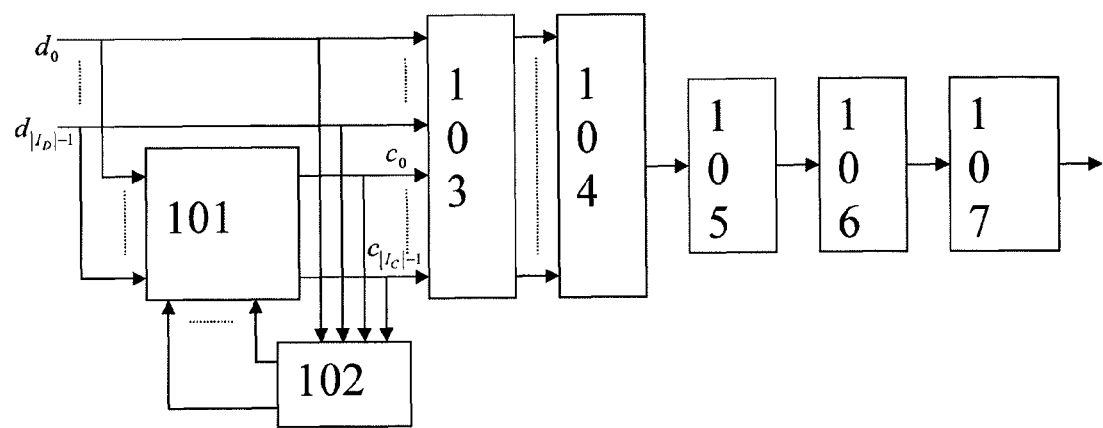
FIG. 2 shows block diagram of an example transmitter according to the invention.

FIG. 2 shows a schematic block diagram of a transmitter in accordance with the present invention. The solver block 101 solves and takes as input the data symbols from a current OFDM symbol. The solver block can e.g. be a LS-solver block, or the like. Through a delay block 102 the solver block 101 also receives data symbols from a previous OFDM symbol and weighting vector coefficients $c_k$ used for the previous symbol. Following the Inverse Fast Fourier Transform (IFFT) block 103 is a parallel-to-serial conversion block 104, a preferred cyclic prefix insertion block 105 and a digital-to-analog (D/A) conversion block 106. The present invention is preferably realized for operations in the baseband independent of high frequency or radio frequency signal generation. For such a realization, an up-conversion block 107, converts the baseband signal from the D/A block 106 to radio frequency range. Despite being described schematically as distinctive blocks, this does not exclude that some or all of the various abovementioned blocks are integrated and merged into common processing circuitry or a generic signal processing device provided with software operating accordingly.

Generally, a transmitter according to the present invention includes, preferably as part of the solver block 104, an allocation device, allocating at least one non-data subcarrier. The transmitter, preferably forming part of the solver block 104, also includes a determination device, determining a weighting vector based on an initial error vector, where the initial error vector is determined from a time domain signal shape of at least a part of a current OFDM symbol and at least a part of a previous OFDM symbol, respectively. Further, it includes a modulation device, modulating the at least one non-data subcarrier using the weighting vector, and an addition device for including the at least one non-data subcarrier as modulated to the set of subcarriers being used for the transmission, preferably integrated with the IFFT block 103.

The transmitter of the invention can be adapted to include means for performing any of the steps of the method of the invention. A trivial requirement is of course that such a step does involve the transmitter.

The method of the invention is e.g. implemented by a computer program, having code means, which when run in a computer causes the computer to execute processing control. The computer program is included in a computer readable medium of a computer program product. The computer readable medium may consist of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Further, as was stated above, in order to use the invention in a communication system, a set of reserved subcarriers $I_C$ has to be available for the purpose of reducing out-of-band emissions. The subcarriers in the set $I_C$ does not have to be demodulated at the receiver. This set of subcarriers $I_C$ may vary over time and may be known by the receiver by predetermination or by signaling.

Depending on the implementation, the formation of this set is either defined explicitly in a communications standard specification, or the system can utilize unused data tones (e.g. unscheduled resource blocks, which the receiver will not demodulate).

Figure 3:
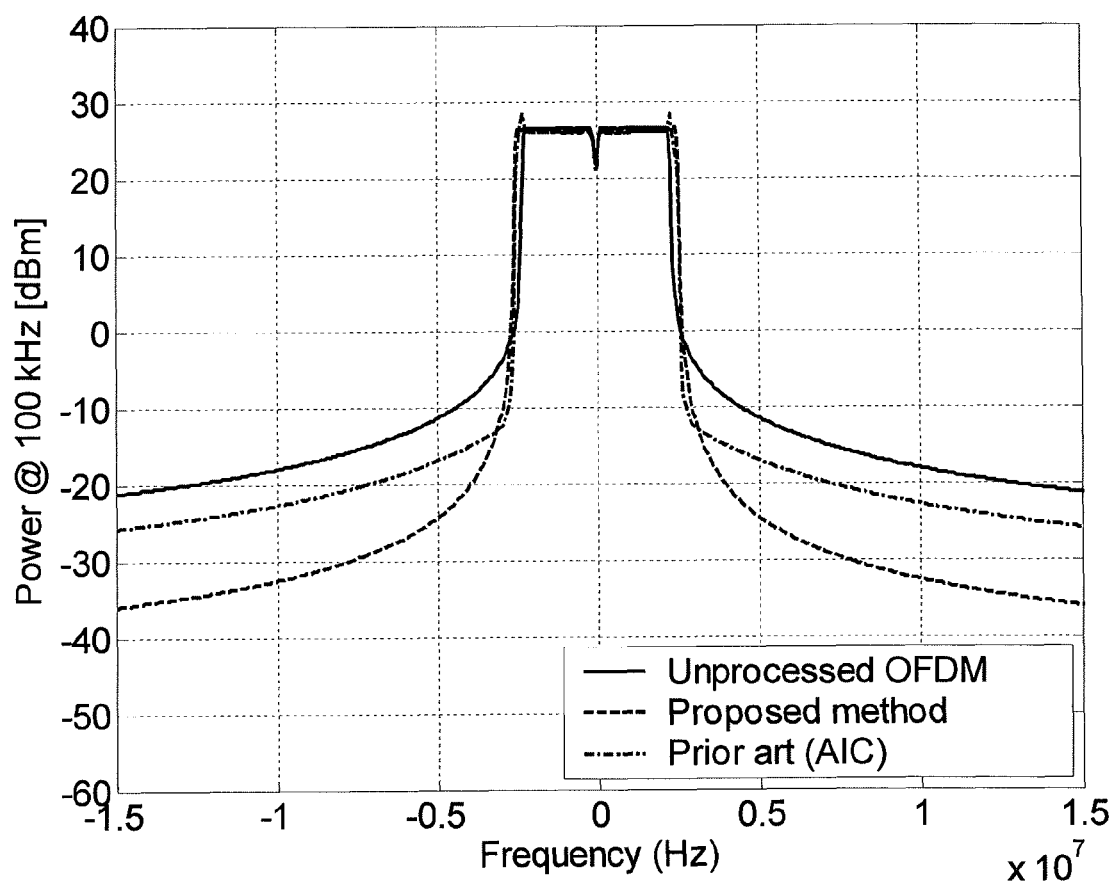
FIGS. 3 and 4 show example frequency spectrums resulting from transmissions in accordance with embodiments of the invention.

In FIG. 3, an example spectrum is plotted for a 5 MHz E-UTRA OFDM signal with N=300 data subcarriers and $\Delta f$=15 kHz. The figure shows the spectral density filtered through a 100 kHz wide filter with the y-axis denoting a resulting transmit power in dBm. The total signal power is 20 W for all cases and the proposed method of the embodiment of constrained energy originating from equation (eq. 9) is evaluated using 4 connecting points, for the energy constraint $\|c_i\|_2 \leq \sqrt{|I_C| \cdot E_d}$ (denoted 0 dB power boost), where $E_d$ is the energy of a data symbol. The 0 dB case means that the total energy on the added $|I_C|$ subcarriers is at most equal to the total energy of $|I_C|$ data subcarriers. The non-data subcarriers are inserted as a comb over the whole data bandwidth, resulting in 330 occupied subcarriers altogether. The sampling period is set to $T_{samp}=T_s/4096$.

For comparison, in FIG. 3 a corresponding example spectrum of the AIC method and unprocessed OFDM for references. For the AIC, a victim-band has been set corresponding to the whole side band. The non-data subcarriers are located next to the outmost data subcarriers.

Figure 4:
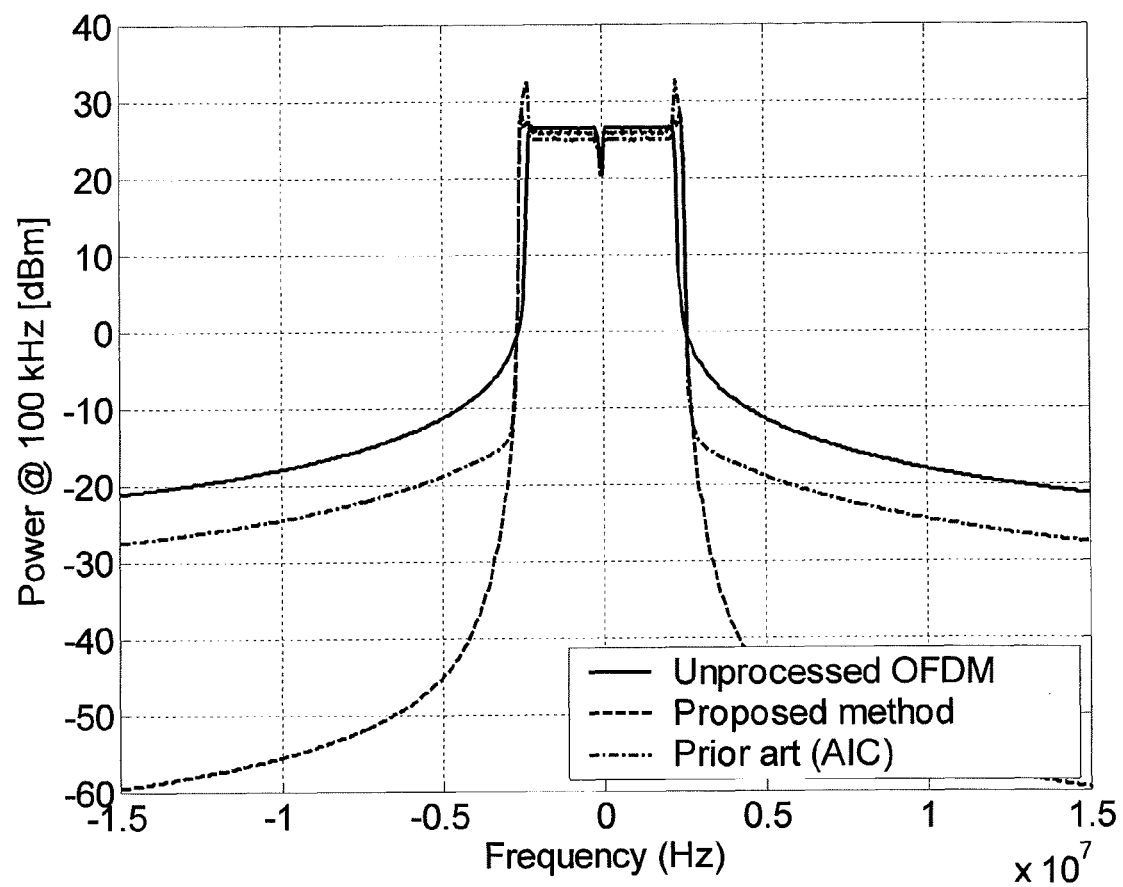

In FIG. 4, the proposed method of the embodiment of constrained energy originating from equation (eq. 9) is correspondingly demonstrated again using 4 connecting points but for the energy constraint $\|c_i\|_2 \leq \sqrt{4|I_C| \cdot E_d}$ (denoted 6 dB power boost).

It is clearly shown in FIGS. 3 and 4 that the present invention is capable of providing significant reduction in out-of-band emissions. The lower level of the out-of-band emission translates into an increase in spectral efficiency, as adjacent carriers can be placed more densely, which is very advantageous.

In Table 1, relative gains in spectral efficiency are given at different power levels of the y-axis for the example in FIG. 3. The gain in spectral efficiency is here computed by comparing the bandwidth of the signals at a given level in the power spectrum. The added subcarriers for out-of-band emission are included in the measured bandwidth. It can be seen that the present invention performs far better than both classical OFDM and AIC.

TABLE 1

| Power level [dBm] | AIC vs. OFDM | Invention method vs. OFDM | Invention method vs. AIC |
|---|---|---|---|
| −10 | 63.5% | 62.2% | −0.7% |
| −15 | 131.5% | 153.4% | 9.5% |
| −20 | 124.8% | 332.8% | 92.5% |
| −25 | N/A | N/A | 239.4% |

The method and apparatus for out-of-band emission reduction according to the invention may be modified by those skilled in the art, as would be apparent from the example embodiments described above.

We claim:

1. A method of OFDM (Orthogonal Frequency Division Multiplex) signal transmission, said method comprising:
   for at least a first one of a plurality of OFDM symbols and a first set of data subcarriers:
   allocating at least one subcarrier for non-data,
   determining a representation of a weighting signal for a predetermined level of signal continuity over time based on a representation of an initial error signal, said representation of an initial error signal being determined from at least part of said first one of a plurality of OFDM symbols and at least part of a second one of said plurality of OFDM symbols, and
   modulating the at least one non-data subcarrier according to said representation of said weighting signal, wherein the first one and the second one of said plurality of OFDM symbols are time-consecutive, and
   the OFDM signal transmission comprises modulated at least one carrier from the set of data subcarriers and the modulated said at least one non-data subcarrier.

2. The method according to claim 1, further comprising transmitting the second one of said plurality of OFDM symbols prior to the first one of the plurality of OFDM symbols.

3. The method according to claim 2, wherein said signal representation of said initial error signal corresponds to continuity over time of a derivative of the signal of order n, where n is a natural number, of said OFDM signal for a transition in time from said second to said first OFDM symbol.

4. The method according to claim 1, wherein said representations are vector representations and the initial error vector for the i:th OFDM symbol, where i is an integer, is $$b_i = A_D d_i - (B_C c_{i-1} + B_D d_{i-1}),$$

where
$A_D$, $B_C$, and $B_D$ are matrices describing the contribution of modulated subcarriers to the time domain signal shape of at least a part of an OFDM symbol,
$d_i$ is a vector with data to be transmitted for the i:th OFDM symbol, and
$c_i$ is the weighting vector for the i:th OFDM symbol.

5. The method according to claim 1, wherein the determining of said representation of a weighting signal comprises minimizing a measure of a representation of a remaining error signal, said representation of the remaining error signal comprising said representation of a weighting signal and said representation of an initial error signal.

6. The method according to claim 5, wherein said representations are vector representations and the remaining error vector for an i:th OFDM symbol, where i is an integer, is $$A_C c_i + b_i,$$

where
$A_C$ is a matrix describing the contribution of modulated subcarriers to the time domain signal of at least a part of an OFDM symbol,
$b_i$ is the initial error vector for the i:th OFDM symbol, and
$c_i$ is the weighting vector for the i:th OFDM symbol.

7. The method according to claim 6, wherein said measure of said remaining error vector is:

$$\|A_C c_i + b_i\|,$$

where

∥•∥ is a norm.

8. The method according to claim 6, further comprising determining said weighting vector, $c_i$, for the i:th OFDM symbol to satisfy $$\min_{c_i}\|A_C c_i + b_i\|,$$

where $A_C$ is a matrix describing the contribution of modulated subcarriers to the time domain signal shape of at least a part of an OFDM symbol, $b_i$ is said initial error vector for the i:th OFDM symbol, $c_i$ is said weighting vector to be determined for the i:th OFDM symbol, and ∥•∥ is a norm.

9. The method according to claim 4, further comprising determining the matrices $A_D$, $B_C$ and $B_D$, based on at least one pair of derivatives of order n, where n is a natural number, at a point in time, the two derivatives of a pair in said at least one pair being determined for two time-consecutive OFDM symbols.

10. The method according to claim 9, wherein a remaining error vector $A_C c_i + b_i$, is based on matrices, $A_C$, $A_D$, $B_C$, $B_D$, said matrices $A_C$, $A_D$, $B_C$, $B_D$ being determined based on at least one pair of derivatives of order n, where n is a natural number, at a point in time, the derivatives in said at least one pair being determined for two time-consecutive OFDM symbols.

11. The method according to claim 1, wherein the initial error signal is determined on the basis of $$\left.\frac{d^n}{dt^n}s_i(t)\right|_{t=-T_g} = \left.\frac{d^n}{dt^n}s_{i-1}(t)\right|_{t=T_s}, n \in I_N,$$

where $s_i(t)$ is the i:th OFDM symbol including both data subcarriers and non-data subcarriers, defined on the interval $-T_g \leq t < T_s$, $I_N$ is a set of non-negative integers, $T_s$ is a data symbol time, and $T_g$ is a guard interval time, $T_g \geq 0$.

12. The method in claim 1, further comprising determining the representation of a weighting signal on the basis of $$s_i(t_n - T_g) = s_{i-1}(t_n), t_n \in I_N,$$

where $s_i(t)$ is the i:th OFDM symbol, including both data subcarriers and non-data subcarriers, defined on the interval $-T_g \leq t < T_s$, $I_N$ is a set containing sampling time-points, $T_s$ is a data symbol time, $T_s > 0$, and $T_g$ is a guard interval time, $T_g \geq 0$.

13. The method according to claim 12, wherein the samples used in the comparison are taken at points in time corresponding to a uniform sampling, $$t_n = n \cdot T_{samp},$$

for n being an integer and $T_{samp}$ being a sampling period.

14. The method according to claim 5, wherein said representations are vector representations, and for which weighting vector signal continuity corresponding to a minimum equal to zero is achieved for a transition between two time-consecutive OFDM symbols when said at least one non-data subcarrier is modulated by the weighting vector.

15. The method according to claim 5, wherein the weighting signal complies with an energy constraint.

16. The method according to claim 15, wherein said representations are vector representations and the weighting vector, $c_i$, for the i:th OFDM symbol satisfies:

$$\min_{c_i}\|A_C c_i + b_i\|,$$

where the energy is constrained according to:

$$\|c_i\| \leq \sqrt{E},$$

where $A_C$ is a matrix describing the contribution of modulated subcarriers to the time domain signal shape of at least a part of an OFDM symbol, $b_i$ is said initial error vector for the i:th OFDM symbol, $c_i$ is said weighting vector to be determined for the i:th OFDM symbol, E is an energy, and ∥•∥ is a norm.

17. The method according to claim 1, comprising rotating the phase rotation of at least one of the first one and the second one of the plurality of OFDM symbols prior to determining said representation of an initial error signal, said phase rotation aligning the phase for at least a part of said first one and said second one of said plurality of OFDM symbols.

18. Computer program product comprising an OFDM (Orthogonal Frequency Division Multiplex) signal transmission program stored in a non-transitory computer readable medium, which when run in a computer causes the computer to:

for at least a first one of a plurality of OFDM symbols and a first set of data subcarriers:

allocate at least one subcarrier for non-data, determine a representation of a weighting signal for a predetermined level of signal continuity over time based on a representation of an initial error signal, said representation of an initial error signal being determined from at least part of said first one of a plurality of OFDM symbols and at least part of a second one of said plurality of OFDM symbols, and modulate the at least one non-data subcarrier according to said representation of said weighting signal, wherein the first one and the second one of said plurality of OFDM symbols are time-consecutive, and the OFDM signal transmission comprises modulated at least one carrier from the set of data subcarriers and the modulated said at least one non-data subcarrier.

* * * * *